Patented Oct. 19, 1937

2,096,258

UNITED STATES PATENT OFFICE 2,096,258

PYROTECHNIC DEVICE

Jacob D. Neuss, Woodbridge, N. J., assignor to Essex Specialty Co., Inc., Berkeley Heights, N. J., a corporation of New Jersey No Drawing. Application January 8, 1936, Serial No. 58,143

1 Claim. (Cl. 52—24)

This invention relates, generally, to pyrotechnic devices, and the invention has reference, more particularly, to a novel pyrotechnic device of the "devil" type, i. e., the type ignited by abrasion, percussion or heat, and adapted to burn relatively slowly with intermittent or staccato detonations, the combustion of this novel firework taking place in such manner that the article does not explode in mass but is accompanied by rapid intermittent, small and harmless explosions.

Heretofore, such fireworks have been made with poisonous yellow or white phosphorus, an oxygen supplying agent such as potassium chlorate, and an organic binder, such as shellac or gum. In order to avoid the use of the poisonous yellow or white phosphorus, it has been proposed to use sulphur phosphorus compounds and particularly sesquisulphide of phosphorus as the active agent with an oxygen producing element in the form of potassium chlorate or its equivalent, the mixture being bound together in intimate mixture by a binder such as gum or a cementitious binder comprising gum and magnesium oxide. It has been found however that such binders are not altogether satisfactory, for the reason that the finished article is sensitive to climatic changes, tending to crumble and deteriorate in damp or humid weather.

Also sesquisulphide of phosphorus ($P_4S_3$) is not entirely satisfactory as the active agent owing to its relatively high melting point, i. e., 166° C., which tends to unduly slow up the combustion of the firework while reducing the intensity of the detonations, and also renders the manufacture of the firework more difficult. There are other phosphorus sulphur compounds such as $P_2S_6$, $P_2S_5$ and $P_2S_3$ but none of these compounds are satisfactory, not only because their melting points are higher than that of the sesquisulphide, but because they have objectionable physical or chemical properties. Thus, $P_2S_6$ does not oxidize with a sufficient degree of rapidity, and $P_2S_3$ decomposes too readily in the presence of atmospheric moisture.

It has been proposed to add a relatively small percentage of free phosphorus to the phosphorus sesquisulphide whereby the melting point of the compound is lowered. The addition of a sufficient small quantity of free phosphorus to the compound to appreciably lower its melting point renders the resulting firework poisonous and hence dangerous for children owing to the highly toxic nature of phosphorus and hence the use of phosphorus for lowering the melting point of the $P_4S_3$ is not desirable.

I have found as the result of considerable research that by forming a solid solution of free sulphur and sesquisulphide of phosphorus the melting point of the phosphorus sesquisulphide is materially lowered without detracting from the desirable combustible nature of this compound. Since sulphur is not poisonous the solid solution thereof with $P_4S_3$ does not render the resulting firework poisonous, the same being absolutely harmless to children. I have found that by adding the proper proportion of free sulphur to the $P_4S_3$ I can lower the melting point of this compound by any desired amount up to 135 degrees C., thereby producing an ideal combustible agent.

The principal object of the present invention is therefore to produce an entirely non-toxic pyrotechnic device of the "devil" type that employs sesquisulphide of phosphorus as the active agent together with free sulphur as a means for lowering the melting point of the sesquisulphide, the said firework employing a novel cementitious binder that renders the firework highly moisture resistant, whereby the same may be kept indefinitely without crumbling or deteriorating.

Other objects and advantages of the invention will be apparent from the following description of the ingredients and composition of the invention and of the method of bringing them together in making the product of the invention.

The novel binder which I employ in making up the firework consists of a mixture of magnesium oxide and magnesium sulphate which is intermixed while wet with the other ingredients of the firework, the said binder ingredients combining chemically upon drying to form a hard, cementitious and water resistant basic magnesium sulphate binder.

As an example of the novel composition of the invention the following may be noted in which the proportions given are those preferred but from which deviations may be made to vary the sensitivity, rate of progressive detonation, and the like.

| | Parts by weight |
|---|---|
| Sesquisulphide of phosphorus | 12 |
| Sulphur | 2 |
| Potassium chlorate | 45 |
| Magnesium oxide (heavy) | 20 |
| Magnesium oxide (light) | 11 |
| Hydrated magnesium sulphate | 30 |
| Ground glass | 10 |
| Sand | 9 |
| Iron oxide (red) | 10 |
| Gum arabic | 4 |

In the above example, the ground glass and sand serve as abrasives to facilitate the ignition of the firework as when the same is stepped upon. The iron oxide serves as a filler and also assists in the propagation of the flame throughout the firework, as is also true of the small amount of gum arabic used, the latter also serving to prevent the firework from going out.

In making up the novel firework composition I first prepare a homogeneous solid solution of sulphur and sesquisulphide of phosphorus. This solid solution is prepared by first mixing the sesquisulphide of phosphorus with the sulphur and heating the mixture slightly above its fusion point, i. e., about 40° to 50° C., thereby forming a homogeneous solid solution which is allowed to cool until solidified and then broken up or ground to granular form. I then prepare a water mixture of magnesium oxide (commercial heavy and light grades mixed), hydrated magnesium sulphate, and gum arabic to which is added with thorough mixing potassium chlorate and the solid solution mixture of sesquisulphide of phosphorus. to this resulting mixture is added the filler, i. e., iron oxide, and the abrasive, i. e., ground glass and sand.

It is to be understood that the use of a filler and an abrasive or abrasives is not essential to the production of a satisfactory firework embodying the principles of the present invention, these additional ingredients merely enhancing the desirable properties of the firework, and I may use other fillers or abrasives instead of those named, if desired, such as clay, feldspar and carborundum.

After thorough intermixing, the resultant composition is formed into discs or other shapes and is dried preferably in a drying room kept at about 140° F. When dry, the novel pyrotechnic is complete, the same being relatively hard, dense and non-hygroscopic, and being unaffected by changes in climatic or weather conditions. In addition to its desirable keeping qualities, the pyrotechnic is entirely free from poisonous substances. The basic magnesium sulphate cementitious binder gives the pyrotechnic its desirable hardness and moisture resisting ability, while at the same time this binder prevents the firework from undesired crumbling when stepped on in use.

It is to be understood that chlorates other than potassium chlorate can be used, such for example, as chlorates or perchlorates of sodium, magnesium or calcium, or potassium perchlorate. The proportions of the several ingredients may be varied within reasonable limits, thus the potassium chlorate may vary within ±20 parts, the magnesium oxide (light or heavy) ±10 parts, the magnesium sulphate ±20 parts, the abrasive ±10 parts, the gum arabic ±3 parts and the iron oxide ±4 parts. The percentage of free sulphur in the sulphur-phosphorus sesquisulphide solid solution may vary from approximately 5 to 20%. Instead of using light and heavy magnesium oxide I may use either one alone or in other proportions than that given. I may even use magnesite heated to any degree of calcination. Instead of using gum arabic I may use gum tragacanth, or sandarac, etc. In place of hydrated magnesium sulphate, I may use an equivalent amount of anhydrous magnesium sulphate.

Having thus described my invention, what I claim is:—

A non-toxic and non-hygroscopic firework composition adapted to produce successive detonations when ignited, consisting in the herein named ingredients in the approximate proportions by weight as follows:

| | |
|---|---|
| Potassium chlorate | 45 |
| Magnesium oxide (heavy) | 20 |
| Magnesium oxide (light) | 11 |
| Magnesium sulphate (hydrated) | 30 |
| Gum arabic | 4 |

Together with a solid solution of:

| | |
|---|---|
| Sesquisulphide of phosphorus | 12 |
| Sulphur | 2 |

JACOB D. NEUSS.